L. JENSEN.
WINDMILL CONTROL.
APPLICATION FILED MAR. 18, 1919.
1,319,222.
Patented Oct. 21, 1919.
3 SHEETS—SHEET 2.
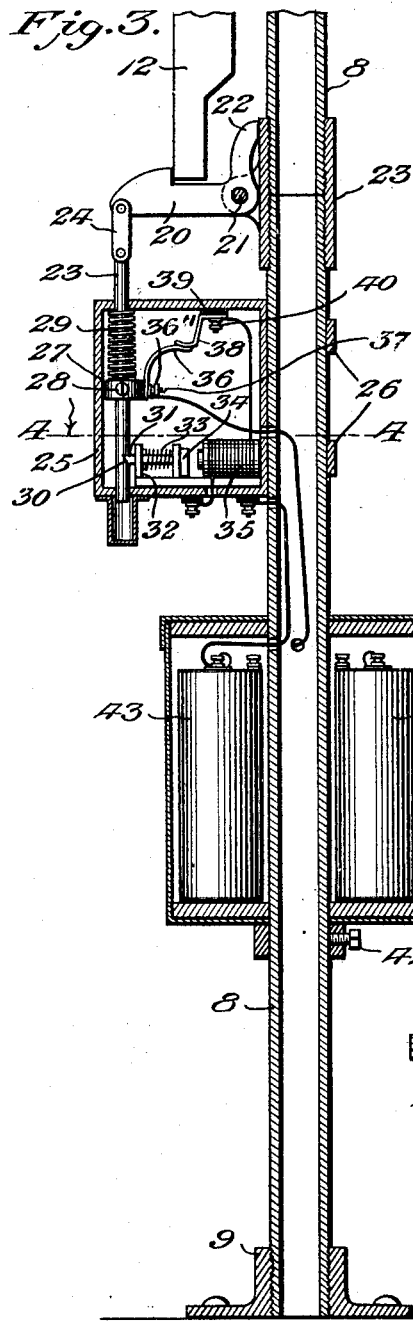
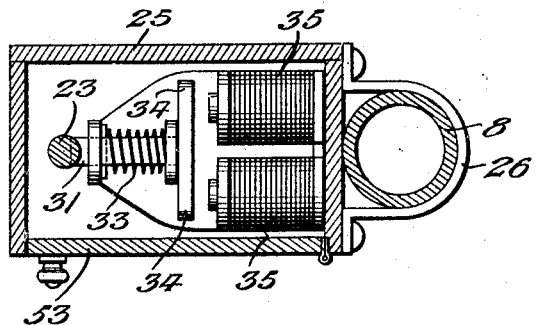
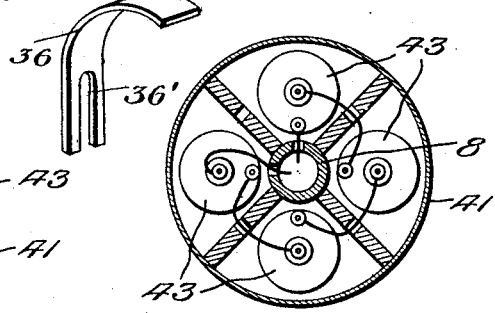
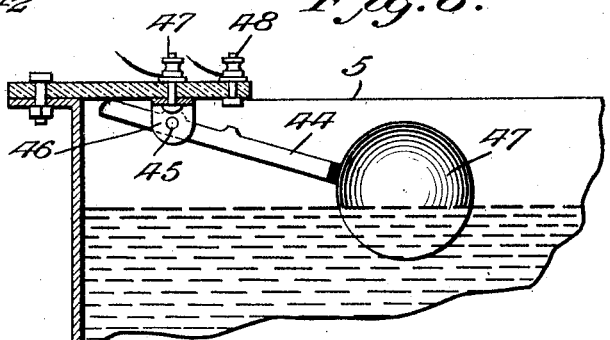
Witnesses
Edwin F. McKee
Inventor
Leslie Jensen
By Victor J. Evans
Attorney L. JENSEN.
WINDMILL CONTROL.
APPLICATION FILED MAR. 18, 1919.
1,319,222.
Patented Oct. 21, 1919.
3 SHEETS—SHEET 3.
Fig. 7.
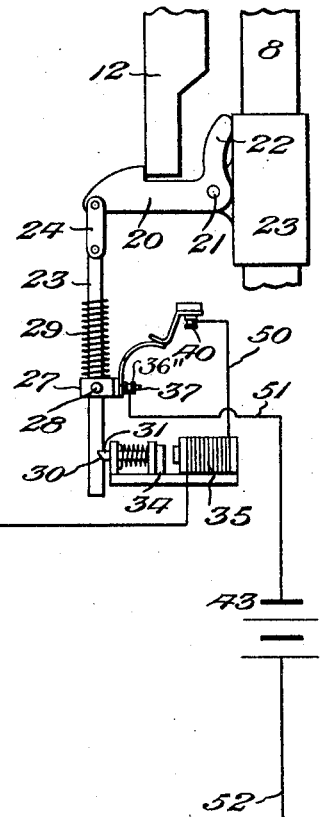
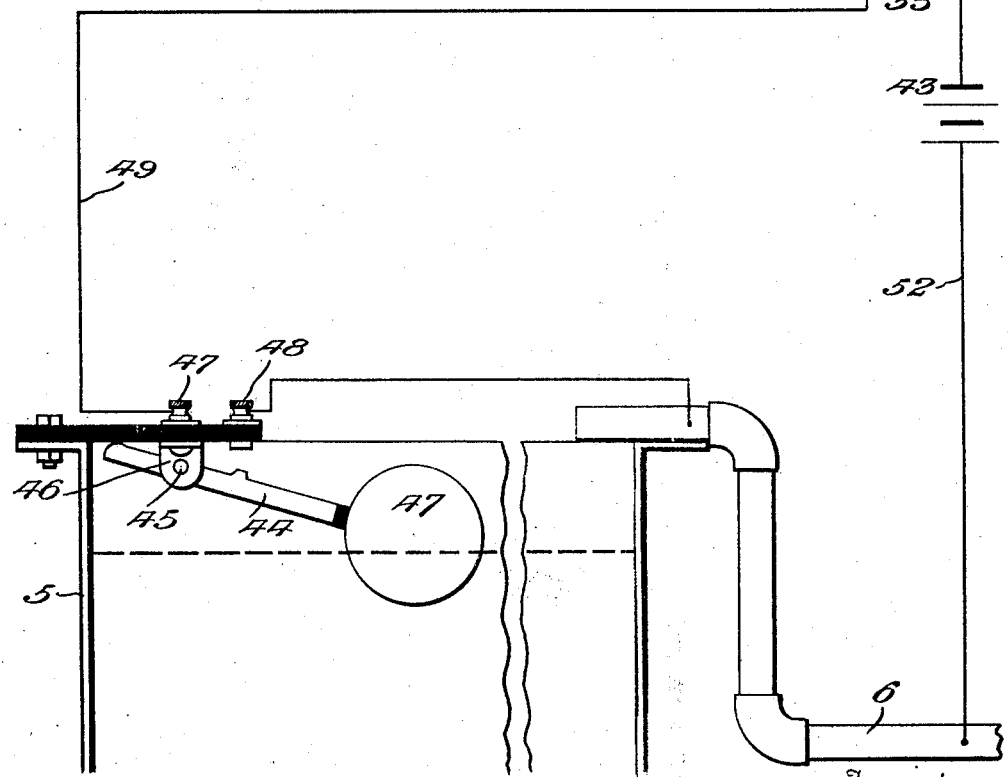
Witnesses
Edwin G. McKee
Inventor
Leslie Jensen
By Victor J. Evans
Attorney

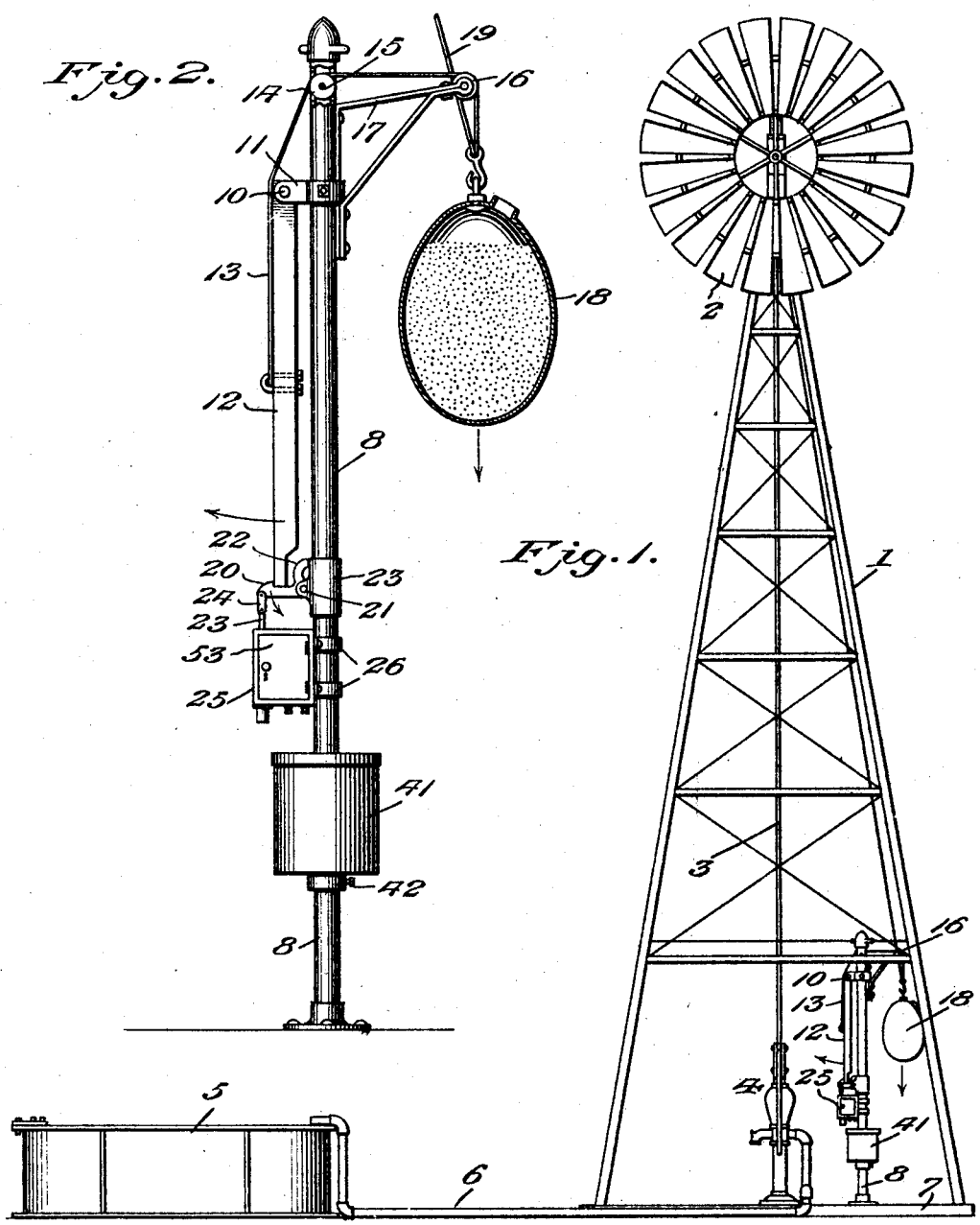

UNITED STATES PATENT OFFICE.

LESLIE JENSEN, OF ALBION, IOWA.

WINDMILL CONTROL.

1,319,222.     Specification of Letters Patent.     Patented Oct. 21, 1919.

Application filed March 18, 1919. Serial No. 283,353.

*To all whom it may concern:*

Be it known that I, LESLIE JENSEN, a citizen of the United States, residing at Albion, in the county of Marshall and State of Iowa, have invented new and useful Improvements in Windmill Controls, of which the following is a specification.

This invention relates to wind mill controlling means the object in view being to provide simple and reliable mechanism whereby a wind mill operatively connected to a pump will be automatically thrown out of operation when the tank becomes filled to a predetermined extent without any attention whatever on the part of the operator, it being practicable to locate the wind mill and pump at a considerable distance from the reservoir or tank into which the water is pumped.

With the above and other objects in view the invention consists in the novel construction, combination and arrangement herein fully described, illustrated and claimed.

In the accompanying drawings:—

Figure 1 is an elevation of the complete apparatus.

Fig. 2 is an enlarged elevation of the wind mill controlling apparatus, certain parts being shown in section.

Fig. 3 is an enlarged vertical sectional view of the same.

Fig. 4 is a horizontal section on an enlarged scale on the line 4—4 of Fig. 3.

Fig. 5 is a horizontal section through the battery box.

Fig. 6 is a fragmentary vertical section through the reservoir or tank, showing the circuit closure.

Fig. 7 is a diagrammatic elevation illustrating the electrical connections.

In Fig. 1 which illustrates the entire apparatus 1 designates a wind mill tower, 2 a wind wheel mounted thereon, 3 the wind mill and pump operating rod, 4 a pump of conventional form and 5 a reservoir or tank into which the water is pumped, the water being discharged from the pump 4 through a pipe 6 into the tank 5.

Secured fixedly to the base or platform 7 of the apparatus is a post 8 which is shown of tubular formation in Fig. 3, said post having an attaching base 9 by means of which it is firmly secured to the platform 7. Pivotally connected at 10 to a bracket 11 extending outwardly from the post 8 is a lever 12 having attached thereto a cord or rope 13 or other flexible connection which extends upwardly around a guide pulley 14 journaled on a stud 15 on the post 8, said flexible connection 13 extending around another guide pulley 16 journaled on a bracket 17 secured to the post 8 as shown in Fig. 2, said flexible connection being attached to a weight 18 shown in the form of a bag filled with sand or other weighting material. Another flexible connection such as a rope 19 is attached to the weight 18 and extends therefrom upwardly where it is attached to the ordinary means for throwing the wind wheel 2 out of the wind and terminating the operation of the wind mill and pump.

When the apparatus is set for operation, the free end of the lever 12 is engaged by a pivotal latch 20 the same being pivotally mounted at 21 on the post 8 and being provided with a stop arm 22 which bears against a sleeve 23ª by means of which the latch is attached to the post 8, the sleeve 23ª surrounding the post as shown in Fig. 3. Pivotally attached to the free end of the latch 20 is a plunger rod 23 the connection between the rod 23 and the latch 20 being shown in the form of a pivotal link 24. The rod 23 extends downwardly through openings in the top and bottom walls of a box 25 secured to the post 8 by means of one or more straps 26. Adjustably secured to the plunger rod 23 is a collar 27, and an adjusting or clamping screw 28 passing through the collar 27 and bearing against the rod 23. Interposed between the collar 27 and the top wall of the box 25 is a compression spring 29 which acts to press the plunger rod downwardly when the latter is released as will hereinafter appear. By adjusting the collar 28 greater or less thrust may be imparted thereto by the spring 29.

The rod 23 is provided with a notch 30 adapted to be engaged by a sliding bolt 31 mounted in some suitable guiding means 32 within the box 25 as shown in Fig. 3. The bolt 31 is pressed toward and held in engagement with the rod 23 by means of a compression spring 33 and said bolt has attached thereto an armature 34 adapted to be attracted by one or more electromagnets 35, said magnets being located within the box 25. A contact finger 36 having an adjusting slot 36′ and an adjusting nut 36″ is attached to the collar 27 by a binding post 37, and another contact finger 38 is attached to the top wall but insulated therefrom as shown at 39 and is provided with another binding post 40. Said contact fingers just described form a circular breaker hereinafter described.

Housed within a battery box 41 secured to the post 8 by suitable fastening means 42 are battery cells 43 the energy of which is used to energize the electro-magnets above referred to. Mounted in the upper portion of the tank or reservoir 5 is a circuit closure shown in the form of a pivoted arm 44, the same being pivotally mounted at 45 on an insulated support or bracket 46 secured to said reservoir. The circuit closure 44 carries at the free end thereof a float 47 which when the water in the reservoir 5 rises to a certain level, moves upwardly and causes the circuit closure or arm 44 to bridge a pair of binding posts 47 and 48. From the binding post 47 a wire 49 leads to the electromagnet 35, another wire 50 leading therefrom to the binding post 40. Another wire 51 leads from the binding post 37 to the battery 43 from which a ground wire 52 leads for convenience to the pipe 6 hereinabove referred to.

From the foregoing description taken in connection with the accompanying drawings, the operation of the wind mill controlling apparatus will now be understood. When the mill and pump are set for operation, the parts of the controlling apparatus are set as shown in Fig. 2 with the lever 12 in engagement with and held by the latch 20, the latch in turn being held locked by means of the bolt 31. As soon as the water rises in the tank or reservoir 5, it operates upon the float 47 to close the circuit closure 44 thereupon the battery 43 energizes the electromagnet or magnets 35. Said magnets attract the armature and thereby withdraw the bolt 31 from engagement with the plunger rod 23. The spring 29 now thrusts the rod 23 downwardly and rocks the latch 20 out of engagement with the free end of the lever 12; thereupon the weight 18 pulls the lever 12 upwardly and at the same time pulls downwardly on the flexible connection 19 which operates instantly to throw the wind mill 2 out of operation by a feathering action well understood by those familiar with the art to which this invention appertains.

The box 25 is preferably provided with a lock door 53 in order that the mechanism contained within said box may not be tampered with by an unauthorized person. The mechanism hereinabove described and illustrated in the accompanying drawings is simple in construction, economical to manufacture and maintain and has been found absolutely reliable in use.

Having thus described the invention what I claim is:—

1. In combination with a pump, and a wind mill operatively connected therewith, controlling means for automatically throwing the wind mill out of operation, comprising a water receptacle into which said pump discharges, a float in said receptacle, a float operated closure, gravity operated means for throwing the wind mill out of operation, a lever to hold said gravity operated means inactive, a latch engaging said lever, and an electrically actuated member for operating said latch and releasing said lever, said member being shifted when said circuit closure is operated.

2. In combination with a pump, and a wind mill operatively connected therewith, controlling means for automatically throwing the wind mill out of operation, comprising a water receptacle, into which said pump discharges, a float in said receptacle, a float operated circuit closure, gravity operated means for throwing the wind mill out of operation, a lever to hold said gravity operated means inactive, a latch engaging said lever, an electrically actuated member for operating said latch and releasing said lever, said member being shifted when said circuit closure is operated, and a circuit breaker automatically thrown into operation when said lever is released.

3. In combination with a pump, and a wind mill operatively connected therewith, controlling means for automatically throwing the wind mill out of operation, comprising a water receptacle into which said pump discharges, a float in said receptacle, a float operated circuit closure, gravity operated means for throwing the wind mill out of operation, a lever to hold said gravity operated means inactive, a latch engaging said lever, a spring thrust plunger for actuating said latch, a bolt for holding said plunger, and electrically controlled means for withdrawing said bolt when said circuit closure is operated.

4. In combination with a pump, and a wind mill operatively connected therewith, controlling means for automatically throwing the wind mill out of operation, comprising a water receptacle into which said pump discharges, a float in said receptacle, a float operated circuit closure, gravity operated means for throwing the wind mill out of operation, a lever to hold said gravity operated means inactive, a latch engaging said lever, a spring thrust plunger for actuating said latch a bolt for holding said plunger, and electrically controlled means for withdrawing said bolt when said circuit closure is operated, and means for automatically breaking said circuit during the movement of said plunger.

5. A control apparatus for windmills comprising: a float actuated switch, electromechanical means set into operation upon closing of the switch, and means released by the first means for rendering the wind mill inoperative.

6. A control apparatus for windmills comprising: a normally elevated weight for moving the wind mill to an inoperative position, a catch for holding said weight in an elevated position, and water actuated means for releasing the catch, thereby enabling the weight to move the windmill to an inoperative position.

7. A control apparatus for windmills comprising: an independently supported weight having a connection with a wind mill for moving the same to inoperative position upon movement of the weight, means for releasing the weight so that the same may gravitate, and electro-mechanical means, water actuated, for setting into operation said first means.

8. Control apparatus for windmills comprising: a float actuated switch, turning means connected to the windmill, and means for preventing operation of said first means, but releasing the same after the required amount of movement of the float.

9. Control apparatus for windmills comprising: a weight connected to the windmill to move the same to inoperative position, a catch supporting the weight, spring pressed plunger for moving the catch in a direction to release the weight, and water actuated means normally holding the means against actuation.

10. Control apparatus for windmills comprising: a suspended weight adapted when released to move the windmill to inoperative position, a catch for holding the weight in an elevated position, a spring pressed plunger for releasing the catch, and an electric device under normal condition preventing movement of the plunger and adapted under abnormal condition to be energized and release said plunger.

In testimony whereof I affix my signature.

LESLIE JENSEN.

Copies of this patent may be obtained for five cents each, by addressing the "Commissioner of Patents, Washington, D. C."